May 21, 1940.  W. I. JONES  2,201,401

SHEET METAL NUT AND NUT INSTALLATION

Filed May 27, 1937

Inventor:
Walter I. Jones by

Att'y.

Patented May 21, 1940

2,201,401

UNITED STATES PATENT OFFICE 2,201,401

SHEET METAL NUT AND NUT INSTALLATION

Walter I. Jones, Arlington, Mass., assignor to United-Carr Fastener Corporation, Cambridge, Mass., a corporation of Massachusetts Application May 27, 1937, Serial No. 145,059

3 Claims. (Cl. 85—32)

This invention aims to provide improvements in nut members and installations of the same.

Referring to the drawing, in which I have illustrated a preferred embodiment of my invention:

Figure 1:
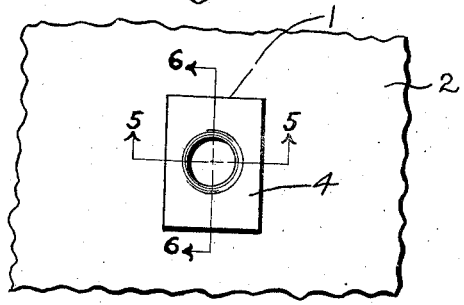
Figure 1 is a front view of my improved nut member assembled with a supporting structure.
Figure 2:
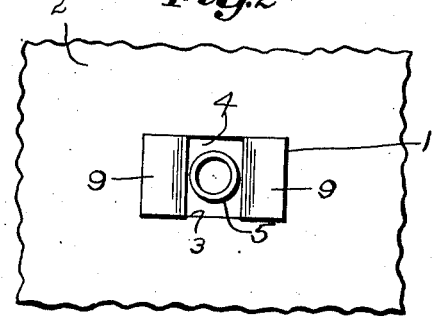
Fig. 2 is a rear view of the installation shown in Fig. 1.
Figure 3:
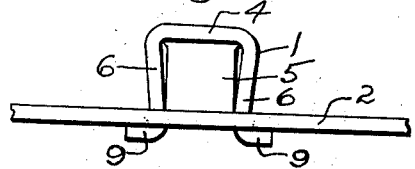
Fig. 3 is an end view of the installation shown in Fig. 1.
Figure 4:
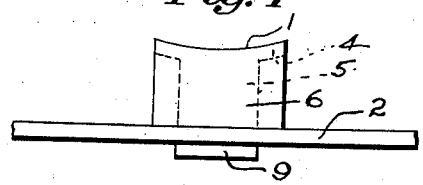
Fig. 4 is a side view of the installation shown in Fig. 1.

Referring to my preferred installation illustrated in Figs. 1-6 of the drawing, I have shown a nut member 1 in fastened assembly with a fragment of a supporting structure 2. The supporting structure 2 has a rectangular aperture 3 therein (Figs. 2 and 5) which permits entrance of a threaded screw or bolt member to a correspondingly threaded shank portion of the nut member. My improved nut member is secured to the supporting structure 2 through means of attaching portions extending from one end of the nut device through the aperture 3 of the supporting structure and having portions engaging opposite surfaces of the supporting structure in a manner to be described. My improved nut member is particularly useful in connection with those installations where for reasons of quick assembly it is expedient to have the nut members securely affixed to a supporting part prior to attachment of another member to the supporting part.

Figure 5:
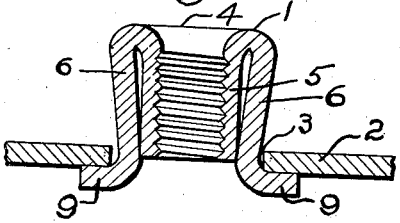
Fig. 5 is an enlarged section taken along the line 5—5 of Fig. 1.
Figure 6:
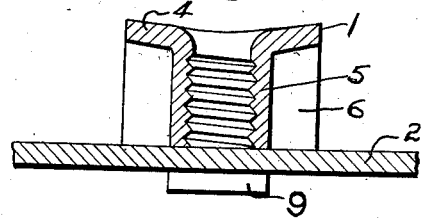
Fig. 6 is an enlarged section taken along the line 6—6 of Fig. 1.
Figure 7:
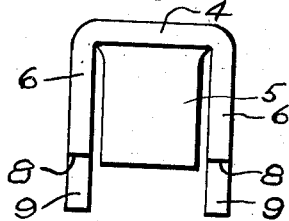
Fig. 7 is an end elevation of my nut member per se.
Figure 8:
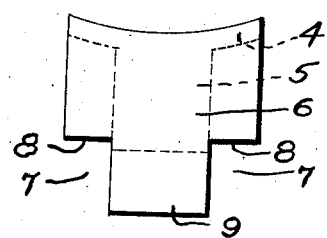
Fig. 8 is a side elevation of the nut member shown in Fig. 7.

The nut member 1, as illustrated in the drawing, is made from a single piece of sheet metal and is provided with a base 4 from which extends a tubular portion 5. The tubular portion 5, in my preferred form, is internally threaded, as shown in Figs. 5 and 6, for threaded engagement with a cooperating member. As a means for securing my nut member to a support I have provided, in my preferred form, substantially rectangular wing-like attaching portions 6 integral with opposed sides of the base 4 and extending from the base 4 along the sides of the tubular portion 5 to a position beyond the free end of the tubular portion, as most clearly shown in Figs. 7 and 8. Each of the attaching portions 6—6 has notches 7—7 (Fig. 8) in opposed sides thereof adjacent its free end providing shoulders 8—8 (Figs. 7 and 8) and a clamping portion 9 intermediate the shoulders 8—8 which is adapted to be bent into clamping engagement with a surface of the supporting structure 2.

When assembling my improved nut member with the supporting structure, the shoulders 8—8 of the attaching portions 6—6 are moved into engagement with the material of a surface of the supporting structure adjacent the aperture 3 with the respective clamping portions 9 extending through the aperture. Then by any suitable tool the clamping portions 9 are bent into clamping engagement with an opposite surface of the supporting structure from that engaged by the shoulders 8—8 whereby the shoulders and the clamping portions cooperate to fasten securely the nut member to the support. At the same time the clamping portions combine with the rectangular aperture 3 in a way to prevent relative rotation of the parts. When the nut member is in fastened relation with the supporting structure, the internally-threaded tubular portion 5 is in alignment with the aperture 3 of the support and, therefore, in position to receive a cooperating screw or bolt member (not shown).

Although in my preferred form of invention hereinabove described I have chosen to provide a pair only of attaching portions, it is understood that obvious modifications may be made in the construction of my preferred device so as to provide more attaching portions without departing from the scope and spirit of my present invention.

Thus by my invention I have provided nut members of simple and inexpensive construction capable of being quickly secured to a support for carrying out the desired functions.

Although I have illustrated and described a preferred embodiment of my invention, I do not wish to be limited thereby because the scope of my invention is best defined in the following claims.

I claim:

1. A fastener device comprising a tubular portion extending from one end of said device for receiving a cooperating fastener member, and a flat attaching portion extending from the same end of said device as said tubular portion, said attaching portion extending along the side of said tubular portion, and said attaching portion having a bendable portion at its free end adapted to be bent into engagement with one surface of a support and a shoulder means adapted to engage an opposed surface of said support whereby said bendable portion and said shoulder means may cooperate to secure said device to said support.

2. A one-piece nut device comprising a base, an internally-threaded tubular portion extending from said base for receiving a cooperating threaded member, and a pair of flat attaching portions extending from said base along the side of said tubular portion in close relation thereto, each of said attaching portions having a free end portion for engagement with a surface of a support and a shoulder means adapted to engage an opposed surface of said support whereby said free end portions and said shoulder means may cooperate to secure said device to said support.

3. A nut device comprising a threaded tubular portion extending from an end of said device for receiving a cooperating threaded member, and a pair of wing-like attaching portions extending from the same end of said device as said tubular portion along the side of said tubular portion, each of said attaching portions having notches in the sides thereof adjacent its free end providing shoulders adapted to engage one surface of a support and a bendable portion intermediate said shoulders adapted to extend through an aperture of a support and be bent into clamping engagement with an opposite surface of said support from that engaged by said shoulders.

WALTER I. JONES.